(12) United States Patent
Settle et al.

(10) Patent No.: US 7,079,585 B1
(45) Date of Patent: Jul. 18, 2006

(54) GRAY ENCODING FOR HIERARCHICAL QAM TRANSMISSION SYSTEMS

(75) Inventors: Timothy Forrest Settle, Cumming, GA (US); Thomas Peter Krauss, Algonquin, IL (US); Kumar Ramaswamy, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 799 days.

(21) Appl. No.: 10/148,223

(22) PCT Filed: Nov. 22, 2000

(86) PCT No.: PCT/US00/32011

§ 371 (c)(1),
(2), (4) Date: Oct. 25, 2002

(87) PCT Pub. No.: WO01/39456

PCT Pub. Date: May 31, 2001

Related U.S. Application Data

(60) Provisional application No. 60/167,024, filed on Nov. 23, 1999.

(51) Int. Cl.
*H04L 23/02* (2006.01)
*H04L 27/36* (2006.01)
(52) U.S. Cl. ...................... 375/261; 375/298
(58) Field of Classification Search ............ 375/261, 375/341, 298, 262; 329/304; 332/103
See application file for complete search history.

(56) References Cited

U.S. PATENT DOCUMENTS

| 5,966,412 A | 10/1999 | Ramaswamy .............. 375/341 |
| 6,198,763 B1* | 3/2001 | Inoue et al. ................ 375/130 |
| 6,229,856 B1* | 5/2001 | Diab et al. .................. 375/316 |
| 6,490,260 B1* | 12/2002 | Hwang ....................... 370/335 |

FOREIGN PATENT DOCUMENTS

EP 869 649 A2 10/1998

OTHER PUBLICATIONS

L. Papke et al., "*Combined Multilevel Turbo-Code with MR-Modulation*", Seattle, Jun. 18-22, 1995, New York, IEEE, US, Jun. 18, 1995, pp. 668-672.

Khaled Faxel et al., "*Combined multilevel coding and multiresolution modulation*", Proceedings of the Int'l. Conference on Communications (ICC), US, New York, IEEE, May 23, 1993, pp. 1081-1085.

Search Report *.

* cited by examiner

*Primary Examiner*—Khai Tran
(74) *Attorney, Agent, or Firm*—Joseph J. Laks; Ronald H. Kurdyla

(57) ABSTRACT

A hierarchical QAM system allows the transmission of different sources by embedding the relative constellation points. At the transmitter the constellations generated by the different sources are remapped by a grey coder and then combined. At the receiver, the different source data are decoded by using a corresponding grey code demapper.

16 Claims, 7 Drawing Sheets

| Level 1 Symbol | Level 2 Iout | Level 2 Qout |
|---|---|---|
| 0 | Iin | Qin |
| 1 | -Iin | Qin |
| 2 | Iin | -Qin |
| 3 | -Iin | -Qin |

GRAY ENCODING FOR HIERARCHICAL QAM TRANSMISSION SYSTEMS

This application claims the benefit under 35 U.S.C. § 365 of International Application PCT/US00/32011, filed Nov. 22, 2000, which claims the benefit of U.S. Provisional Application 60/167,024, filed Nov. 23, 1999.

FIELD OF THE INVENTION

The present invention relates to hierarchical quadrature amplitude modulation transmission systems.

BACKGROUND OF THE INVENTION

Hierarchical quadrature amplitude modulation (QAM) transmission systems are well known. For example, U.S. Pat. No. 5,966,412, issued Oct. 12, 1999 to Ramaswamy, discloses a modulation system which can remain backward compatible with older quadrature phase shift keyed (QPSK) receivers, while simultaneously further allowing additional data streams, for providing higher data rates or higher precision data, to be receivable by more advanced receivers. FIG. 1 is a block diagram illustrating a hierarchical QAM transmission system as disclosed in this patent. FIG. 1 discloses a data transmitter 100 coupled to a data receiver 300 via a transmission channel 200.

In FIG. 1, a first input terminal DATA 1 is coupled to source (not shown) of a first data signal, and a second input terminal DATA 2 is coupled to a source (not shown) of a second data signal. The first and second data signals may represent separate and independent data, or may represent related data signals, such as signals carrying respective portions of the same data signal (for increasing the throughput of the transmission system) or a elementary data portion and a supplemental data portion of the same data signal (for transmitting enhanced signals while maintaining backward compatibility with existing older receivers, as described in more detail below). The first input terminal DATA 1 is coupled to an input terminal of a first error detection/correction encoder 102. An output terminal of the first encoder 102 is coupled to an input terminal of a level 1 QPSK modulator 104. An output terminal of the level 1 QPSK modulator 104 is coupled to a first input terminal of a signal combiner 106.

The second input terminal DATA 2 is coupled to an input terminal of a second error detection/correction encoder 108. An output terminal of the second encoder 108 is coupled to an input terminal of a level 2 QPSK modulator 110. The level 2 QPSK modulator 110 is coupled to an input terminal of a variable gain amplifier 111, having a gain of G. An output terminal of the variable gain amplifier 111 is coupled to a second input terminal of the signal combiner 106. An output terminal of the signal combiner 106 produces a combined modulated signal and is coupled to the transmission channel 200. In the illustrated embodiment, this channel is a direct satellite television signal transmission system, and the transmission channel includes a ground transmitting station at the transmitter 100 (represented by a transmitting antenna in phantom), a communications satellite (not shown), for receiving the data from the ground station and rebroadcasting that data to a plurality of ground receiving stations, one of which (300) is illustrated in FIG. 1, which receives and processes the rebroadcast data signal, as illustrated by a receiving antenna in phantom.

The output of the transmission channel 200 is coupled to an input terminal of a level 1 QPSK demodulator 302. An output terminal of the level 1 demodulator 302 is coupled to respective input terminals of a first error detection/correction decoder 304 and a delay circuit 306. An output terminal of the first decoder 304 is coupled to an output terminal DATA 1', and to an input terminal of a reencoder 308. An output terminal of the reencoder 308 is coupled to an subtrahend input terminal of an subtractor 310. An output terminal of the delay circuit 306 is coupled to a minuend input terminal of the subtractor 310. A difference output terminal of the subtractor 310 is coupled to an input terminal of a second error detection/correction decoder 312. An output terminal of the second decoder 312 is coupled to a second data output terminal DATA 2'.

In operation, the first encoder 102 encodes the first data signal DATA 1 to provide error detection/correction capabilities in a known manner. Any of the known error detection/correction codes may be implemented by the encoder/decoder pairs 102/304, 108/312, and those codes may be concatenated, as described in the above mentioned patent. The first encoder 102 produces a stream of encoded bits representing the encoded first data signal DATA 1. The level 1 modulator 104 processes successive sets of two encoded data bits, each set termed a symbol, to generate a QPSK signal which lies in one of four quadrants in a known manner. Similarly, the second encoder 108 encodes the second data signal DATA 2 to provide error detection/correction capabilities in a known manner. The level 2 modulator 110 processes sets of two encoded data bits to also generate a QPSK signal which lies in one of four quadrants. One skilled in the art will understand that additional data signals (DATA 3, etc.) may be respectively error detection/correction encoded by additional encoders and additional QPSK modulators, (level 3, etc.) may be responsive to respective additional sets of two encoded data bits to generate additional QPSK signals. The QPSK signal from the level 1 modulator 104 is given a weight of 1; the QPSK signal from the level 2 modulator 110 is given a weight or gain of 0.5 by the variable gain amplifier 111; the third a weight of 0.25 and so forth. All the weighted QPSK signals are then combined into a single modulated signal by the signal combiner 106 and transmitted through a transmission channel 200.

The level 1 QPSK modulator 104 causes the combined signal to lie within one of four quadrants in response to the set of two encoded data bits from the first encoder 102. Each quadrant, in turn, may be thought of as divided into four sub-quadrants. The level 2 QPSK modulator 110 causes the combined signal to lie within one of the sub-quadrants within the quadrant selected by the level 1 QPSK modulator 104, in response to the set of two input data bits from the second encoder 108. That sub-quadrant may further be though of as divided into four sub-sub-quadrants, and the combined signal caused to lie within one of those sub-sub-quadrants in response to the set of two input data bits from a third encoder (not shown), and so forth.

An older receiver (illustrated in FIG. 1 by a dashed line 300') includes only a level 1 QPSK demodulator 302, which can detect where in the I-Q plane the received signal lies. From that information, the error detection/correction decoder 304 can determine the corresponding two encoded bits in the received first data stream. The error detection/correction decoder 304 can further correct for any errors introduced by the transmission channel to generate a received data signal DATA 1' representing the original first data signal DATA 1. Thus, such a receiver can properly receive, decode, and process a first data signal DATA 1 in the presence of additionally modulated data signals DATA 2, (DATA 3), etc. The signals included by the level 2 (and level 3, etc.) QPSK modulators look simply like noise to such a receiver.

A more advanced receiver 300, on the other hand, can detect which quadrant the received modulated signal lies within, and, thus, can receive, decode, and process successive sets of two data bits representing the first data signal DATA 1. The reencoder 308 in the advanced receiver then regenerates an ideal signal lying in the middle of the indicated quadrant, which is subtracted from the received modulated signal. This operation translates the center of the transmitted signal quadrant to the origin. What remains is a QPSK modulated signal, weighted by 0.5, representing the second data signal DATA 2. This signal is then decoded by the second decoder 312 to determine which sub-quadrant the signal lies within, indicating the set of two bits corresponding to that signal. Successive sets of two received data bits representing the second data signal DATA 2 are, thus, received, decoded and processed, and so forth. Such a transmission system operates by modulating a carrier in quadrature with what is seen as a constellation of permissible symbols, and is a form of quadrature amplitude modulation (QAM). Such a system is termed a hierarchical QAM transmission system because it may be used to transmit other levels of data signals, or other levels of detail in a single signal, while maintaining backwards compatibility with older receivers.

FIG. 2a is a diagram illustrating a constellation in the I-Q plane of permissible symbols for a hierarchical 16QAM transmission system, as illustrated in the above mentioned patent. In FIG. 2a, a first set of two bits determine which quadrant the generated symbol lies within. If the first two bits are "00" then the symbol lies within the upper right hand quadrant, and the level 1 modulator 104 produces I-Q signals such that I=1 and Q=1; if the first two bits are "01" then the symbol lies within the upper left hand quadrant, and the level 1 modulator 104 produces I-Q signals such that I=−1 and Q=1; if the first two bits are "10" then the symbol lies within the lower right hand quadrant and the level 1 modulator 104 produces I-Q signals such that I=1 and Q=−1; and if the first two bits are "11" then the symbol lies within the lower left hand quadrant and the level 1 modulator 104 produces I-Q signals such that I=−1 and Q=−1. This is indicated in FIG. 2a by the appropriate bit pair in the middle of the associated quadrant.

As described above, each quadrant may, itself, be considered to be divided into four sub-quadrants, as illustrated in the upper right hand quadrant in FIG. 2a. The second set of two bits determine which sub-quadrant the symbol lies within. The same mapping is used for determining the sub-quadrant as was described above for determining the quadrant. That is, if the second two bits are "00", then the symbol lies within the upper right hand sub-quadrant and the level 2 modulator generates an I-Q signal such that I=1 and Q=1; if the second two bits are "01" then the symbol lies within the upper left hand sub-quadrant and the level 2 modulator generates an I-Q signal such that I=−1 and Q=1; if the second two bits are "10" then the symbol lies within the lower right hand sub-quadrant and the level 2 modulator generates an I-Q signal such that I=1 and Q=−1; and if the second two bits are "11" then the symbol lies within the lower left hand sub-quadrant and the level 2 modulator generates an I-Q signal such that I=−1 and Q=−1. The variable gain amplifier 111 (of FIG. 1) weights the signal from the level 2 modulator 110 by a weight of 0.5, so the points in the sub-quadrants lie at ±0.5 around the center point of the quadrant. Each of these locations is shown as a solid circle in FIG. 2a, with a four bit binary number illustrating the combination of the first and second sets of two bits, with the first two bits being the right hand pair of bits and the second two bits being the left hand pair.

It is known that the bit error rate performance of the respective data streams through the different levels of a hierarchical QAM system such as described above are different. In general, the bit error rate of the level 1 data stream is better than the bit error rate of the level 2 (and higher) data streams. However, the overall performance of the hierarchical QAM transmission system is optimized when the bit error rate of the respective data streams through the different levels are the same. It is desirable, therefore, to optimize not only the overall bit error rate of the transmission system, but also to more closely match the respective bit error rates of the different levels in the transmission system.

In the system described in the above mentioned patent, constellation points adjacent each other, but lying in different quadrants have respective binary values which differ in more than one bit position. However, it is known that bit error probability may be improved by assigning bit values to adjoining constellation points at all locations which differ by at most one bit position, commonly known as Gray coding.

Such constellations are known, but in some hierarchical systems, it is imperative to maintain backward compatibility with older receivers. That is, known coders and decoders should be able to operate without change. In addition, it is desirable to provide the advantages of Gray coding while maintaining backward compatibility with older receivers all with a minimum of additional circuitry.

European patent publication EP 0 869 649 A2, published Oct. 7, 1998 for Lauterbach et al., discloses a hierarchical system in which a primary data signal is QPSK modulated and a secondary data signal is hierarchically modulated atop that signal. In one disclosed embodiment, the secondary data signal is amplitude modulated atop the primary QPSK signal using a gray coded amplitude encoding for that secondary signal. This system does not, however, disclose providing a complete constellation in which all adjacent constellation points differ by only one bit position, nor does it disclose or discuss backward compatibility with older receivers.

In an article "Combined Multilevel Turbo-Code with MR-Modulation", published Jun. 18–22, 1995 for Papke et al., a multilevel turbo-coded data stream with MR modulation is disclosed and its performance is compared to that of other systems such as a turbo-coded data stream with gray mapping. However, this system does not disclose the nature of the gray mapping and does not disclose or suggest a gray mapping which can maintain backwards compatibility with older receivers.

In an article, "Combined Multilevel Coding and Multiresolution Modulation" published Feb. 8, 1993 for Fazel et al., a multilevel gray coded data stream with a multiresolution modulation is disclosed. However, as illustrated in FIG. 3, the gray coding is applied to the data stream by set-partitioning the entire constellation one bit at a time. There is no disclosure od discussion of a gray coding which can maintain backwards compatibility with older receivers.

SUMMARY OF THE INVENTION

In accordance with principles of the present invention a hierarchical QAM transmission system includes a source of data symbols, each representing a multibit binary value. A hierarchical QAM transmitter is responsive to the value of a data symbol for transmitting one of a constellation of data points in the I-Q plane, each data point in the constellation associated with the value of a symbol such that symbol values of adjoining constellation data points differ by no more than one bit. A hierarchical QAM receiver, responsive to a received data point, for generating a received symbol. The transmitter is characterized by a level 1 QPSK modulator, responsive to a level 1 portion of a data symbol, for generating respective I and Q signals representing a center point of a predetermined one of four quadrants associated with the value of the level 1 portion of the data symbol. A level 2 QPSK modulator is responsive to a level 2 portion of the data symbol, for generating respective I and Q signals representing a center point of the predetermined one of four quadrants associated with the value of the level 2 portion of the data symbol. A signal combiner is coupled to the level 1 modulator and the level 2 modulator, for weighting the respective I and Q signals from the level 2 QPSK modulator by a weighting factor of 0.5 and combining the weighted level 2 I and Q signals with the respective I and Q signals from the level 1 modulator. A gray code mapper is coupled between the level 2 QPSK modulator and the signal combiner for remapping the respective I and Q signals from the level 2 QPSK modulator responsive to the first portion of the data symbol.

A transmission system according to the present invention will transmit signals in a constellation in which adjacent data points represent data values differing by no more than a single bit while allowing current coders and decoders to be used without modification. This is accomplished by the addition of a relatively simple and inexpensive gray code mapper in the transmitter and receiver, in a manner to be described in more detail below.

DETAILED DESCRIPTION

Figure 1:
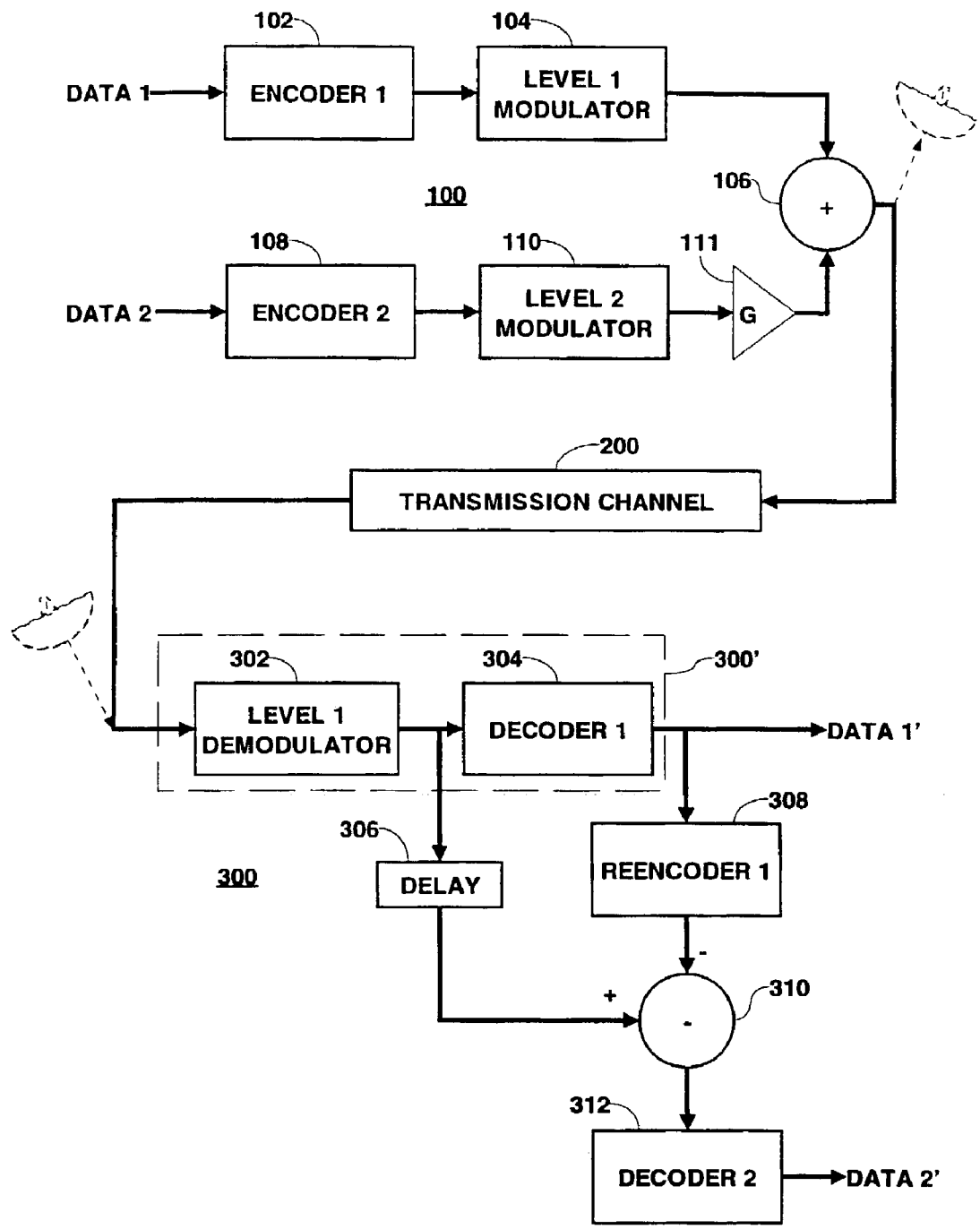
FIG. 1 is a block diagram of a transmission system in accordance with principles of the present invention.
Figure 2:
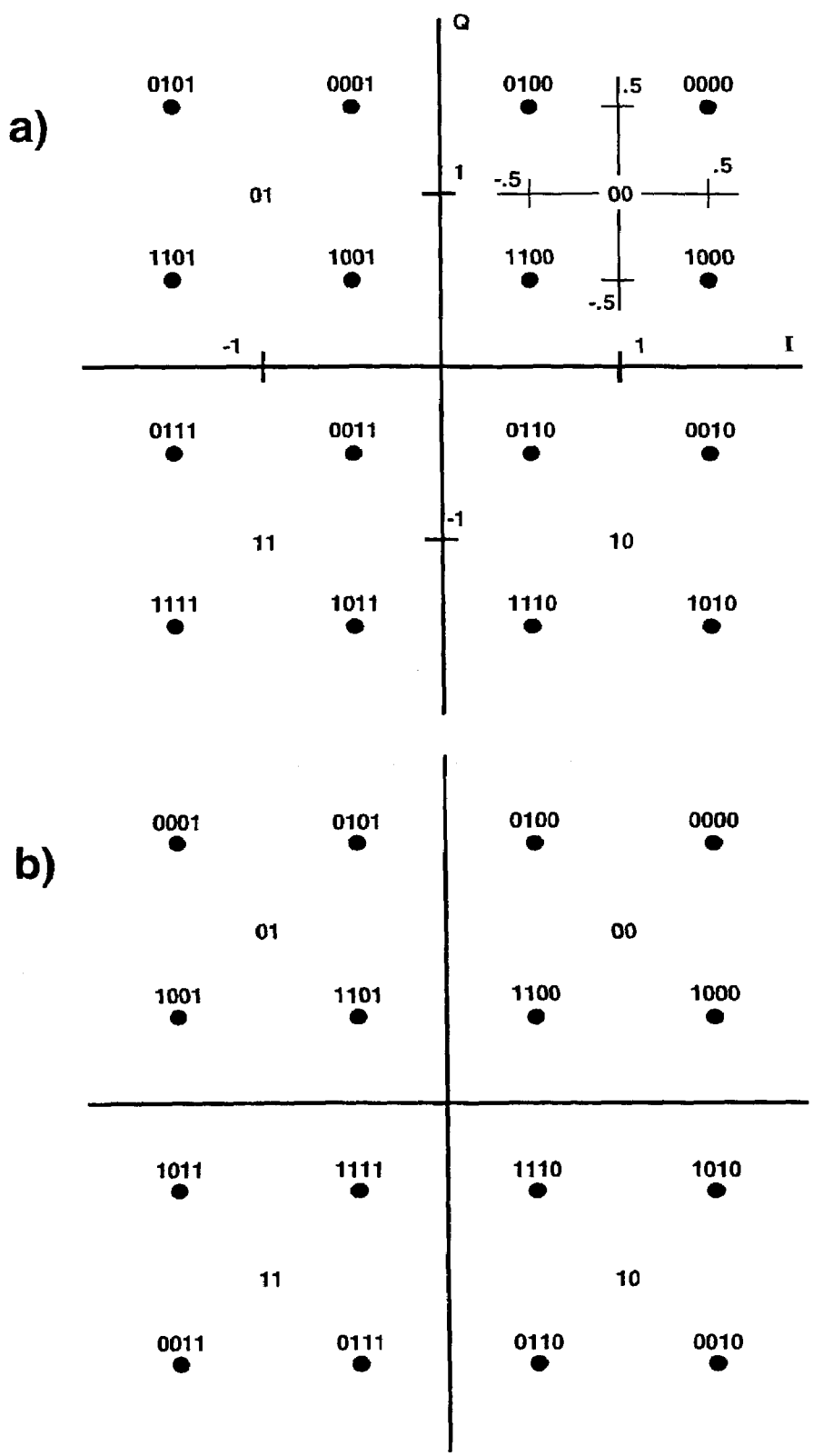
FIG. 2 is a diagram illustrating a constellation of permissible symbols for a hierarchical 16QAM transmission system.
Figure 3:
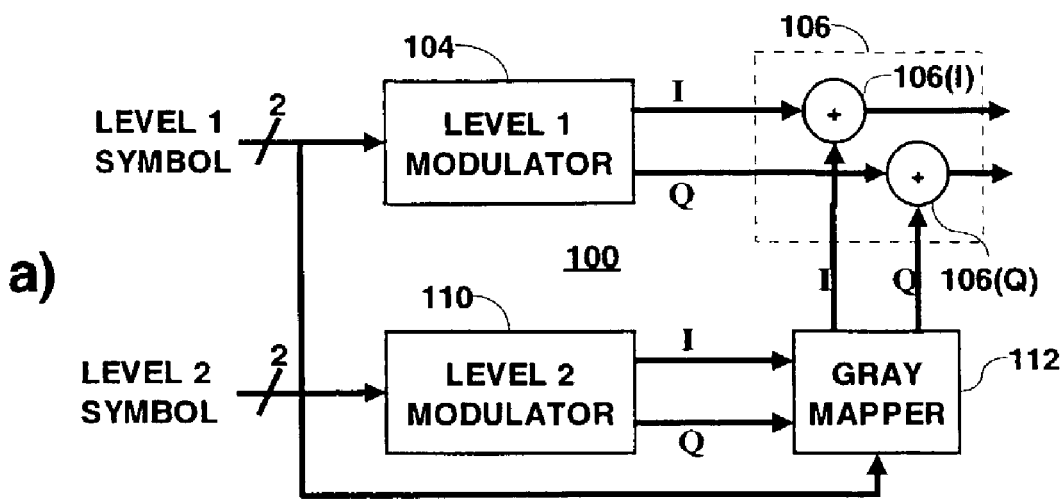
FIGS. 3a and c are more detailed block diagrams of respective portions of the transmission system illustrated in FIG. 1 and further including a gray code mapper.
FIG. 3b is a table containing data controlling the operation of the gray code mapper.
Figure 3:
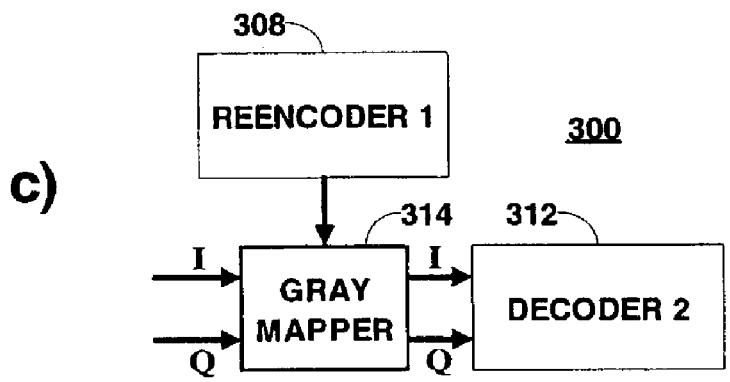

FIGS. 3a and c are more detailed block diagrams of respective portions of the transmission system illustrated in FIG. 1 and further including a gray code mapper, and FIG. 3b is a table illustrating the operation of the gray code mapper illustrated in FIGS. 3a and c. Referring first to FIG. 2b, a constellation in which adjacent points at all locations represent data values which differ in only one bit position is illustrated. To produce this constellation, the mapping of the set of two bits in the encoded level 2 data signal to locations in a sub-quadrant depends on which quadrant that sub-quadrant lies within. The upper right hand quadrant (00) in FIG. 2b is identical to that in FIG. 2a. In the upper left hand quadrant, however, the left and right columns are switched. In the lower right hand quadrant, the top and bottom rows are switched, and in the lower left hand quadrant, the left and right hand columns and the top and bottom rows are switched. This may be performed by a simple mapping operation in the transmitter 100 prior to modulating the encoded second data signal DATA 2, and then a simple demapping operation in the receiver 300 after the received encoded second data signal is demodulated.

In FIG. 3a, a portion of the transmitter 100 is illustrated. A level 1 symbol (two bits from the first encoder 102 of FIG. 1) is coupled to respective input terminals of the level 1 modulator 104 and a gray code mapper 112. An in-phase (I) signal from the level 1 modulator 104 is coupled to a first input terminal of a first adder 106(I) and a quadrature (Q) signal from the level 1 modulator 104 is coupled to a first input terminal of a second adder 106(Q). The combination of the first adder 106(I) and the second adder 106(Q) form the signal combiner 106 of FIG. 1. A level 2 symbol (two bits from the second encoder 108) is coupled to an input terminal of the level 2 modulator 110. An I output terminal of the level 2 modulator 110 is coupled to an I input terminal of the gray code mapper 112, and a Q output terminal of the level 2 modulator 110 is coupled to a Q input terminal of the gray code mapper 112. An I output terminal of the gray mapper 112 is coupled to a second input terminal of the first adder 106(I) and a Q output terminal of the gray mapper 112 is coupled to a second input terminal of the second adder 106(Q). The variable gain amplifier 111, conditioned to have an attenuation factor of 0.5 and coupled between the gray code mapper 112 and the signal combiner 106, is not shown to simplify the figure.

In operation, the level 1 symbol, represented by the set of two encoded data bits, is received from the level 1 encoder 102 (of FIG. 1). The level 1 symbol is QPSK modulated by the level 1 modulator 104 to generate a set of I and Q component signals representing the quadrant of the modulated signal in a known manner. For example, if the symbol is 0, i.e. the two bits are 00, then the upper right hand quadrant is indicated (I=1, Q=1); if the symbol it 1, i.e. the two bits are 01, then the upper left hand quadrant is indicated (I=−1, Q=1); if the symbol is 2, i.e. the two bits are 10, then the lower right hand quadrant is indicated (I=1, Q=−1); and if the symbol is 3, i.e. the two bits are 11, then the lower left hand quadrant is indicated (I=−1, Q=−1). In a similar manner, level 2 symbol is QPSK modulated by the level 2 modulator 110 to generate a set of I and Q component signals representing the sub-quadrant of the modulated signal in a known manner. The level 2 modulator generates the modulated signal in exactly the same manner as the level 1 modulator 104, i.e. if the two bits are 00 (0), then the upper right hand sub-quadrant is indicated (I=1, Q=1); if the two bits are 01 (1), then the upper left hand sub-quadrant is indicated (I=−1, Q=1); if the two bits are 10 (2) then the lower right hand sub-quadrant is indicated (I=−1, Q=1); and if the two bits are 11 (3) then the lower left hand sub-quadrant is indicated (I=−1, Q=−1). This modulated signal is then weighted by 0.5 (not shown).

The resulting constellation from the combination of these two modulated signals would be as illustrated in FIG. 2a. The gray code mapper 112 operates on the I and Q signals from the level 2 modulator 110 to produce the constellation illustrated in FIG. 2b. FIG. 3b illustrates the mapping applied by the gray code mapper 112. If the level 1 symbol is 0, indicating the upper right hand quadrant, then the sub quadrants are unchanged, that is the I and Q output signals from the level 2 modulator are left unchanged. Thus, the I output signal, Iout from the gray code mapper 112 is the same as the I input signal Iin (Iout=Iin), and the Q output signal, Qout from the gray code mapper 112 is the same as the Q input signal Qin (Qout=Qin). If, however the level 1 symbol is 1, indicating the upper left hand quadrant, then, referring to FIG. 2, the columns are switched. That is, positive I values become negative and vice versa. Thus when the level 1 symbol is 1, the I output signal is the negative of the I input signal (Iout=−Iin), while the Q output signal remains the same as the Q input signal (Qout=Qin). If the level 1 symbol is 2, indicating the lower right hand quadrant, then, the rows are switched. That is, positive Q values become negative and vice versa. Thus, when the level 1 symbol is 2, the I output signal is the same as the I input signal (Iout=Iin), while the Q output signal is the negative of the Q input signal (Qout=−Qin). If the level 1 signal is 3, indicating the lower left hand quadrant, then, both the columns and the rows are switched. That is, positive I values become negative, and positive Q values become negative, and vice versa. Thus, when the level 1 symbol is 3, the I output signal is the negative of the I input signal (Iout=−Iin), and the Q output signal is the negative of the Q input signal (Qout=−Qin). The gray code mapper 112 provides this function. The resulting I and Q values from the gray code mapper 112 are weighted with a weight of 0.5 as described above (not shown for simplicity) and combined by the signal combiner 106 with the I and Q values representing the level 1 symbol. The resulting constellation is that illustrated in FIG. 2b.

Such a mapping is reversible in the receiver 300 using a similar gray code mapper. FIG. 3c illustrates a portion of a receiver 300 including such a gray code mapper 314. In FIG. 3c, the output terminal of the reencoder 308 is coupled to an input terminal of the gray code mapper 314. An I signal from the subtractor 310 (of FIG. 1) is coupled to an I input terminal of the gray code mapper 314 and a Q signal from the subtractor 310 is coupled to a Q input terminal of the gray mapper 314. An I output terminal of the gray code mapper 314 is coupled to an I input terminal of the second decoder 312 and a Q output terminal of the gray code mapper 314 is coupled to a Q input terminal of the second decoder 312.

In operation, the reencoder 308 generates a signal which is an ideal representation of the received level 1 symbol. That is, if the received level 1 signal is determined to lie anywhere in the upper right hand quadrant, then the reencoder 308 produces a signal having the value 0; if anywhere in the upper left hand quadrant a value 1, if anywhere in the lower right hand quadrant a value 2 and if anywhere in the lower left hand quadrant a value 3. This symbol is supplied to a gray code mapper 314. Respective I and Q signals from the subtractor 310 are processed by the gray code mapper 314 in the manner described above, and illustrated in FIG. 3b. One skilled in the art will appreciate that the gray code mapper 314 in the receiver 300 operates identically to the gray code mapper 112 in FIG. 3a, and will perform the inverse function performed in the transmitter 100.

The use of gray code mappers (112 and 312) in the transmitter 100 and receiver 300 allow use of a constellation as illustrated in FIG. 2b, in the manner described above with respect to FIG. 3a. A transmission system using the gray code mapping function described above, to produce a constellation in which adjoining constellation points differ by no more than a single bit will increase the bit error rate of the system. Simulations have shown that using gray coding as described above will cut the number of level 2 bit errors in half. This provides an extra margin in the signal to noise ratio (SNR) of around ¼ dB. This improvement, while modest, will, along with other enhancements, provide improved performance of the transmission system as a whole.

Figure 4:
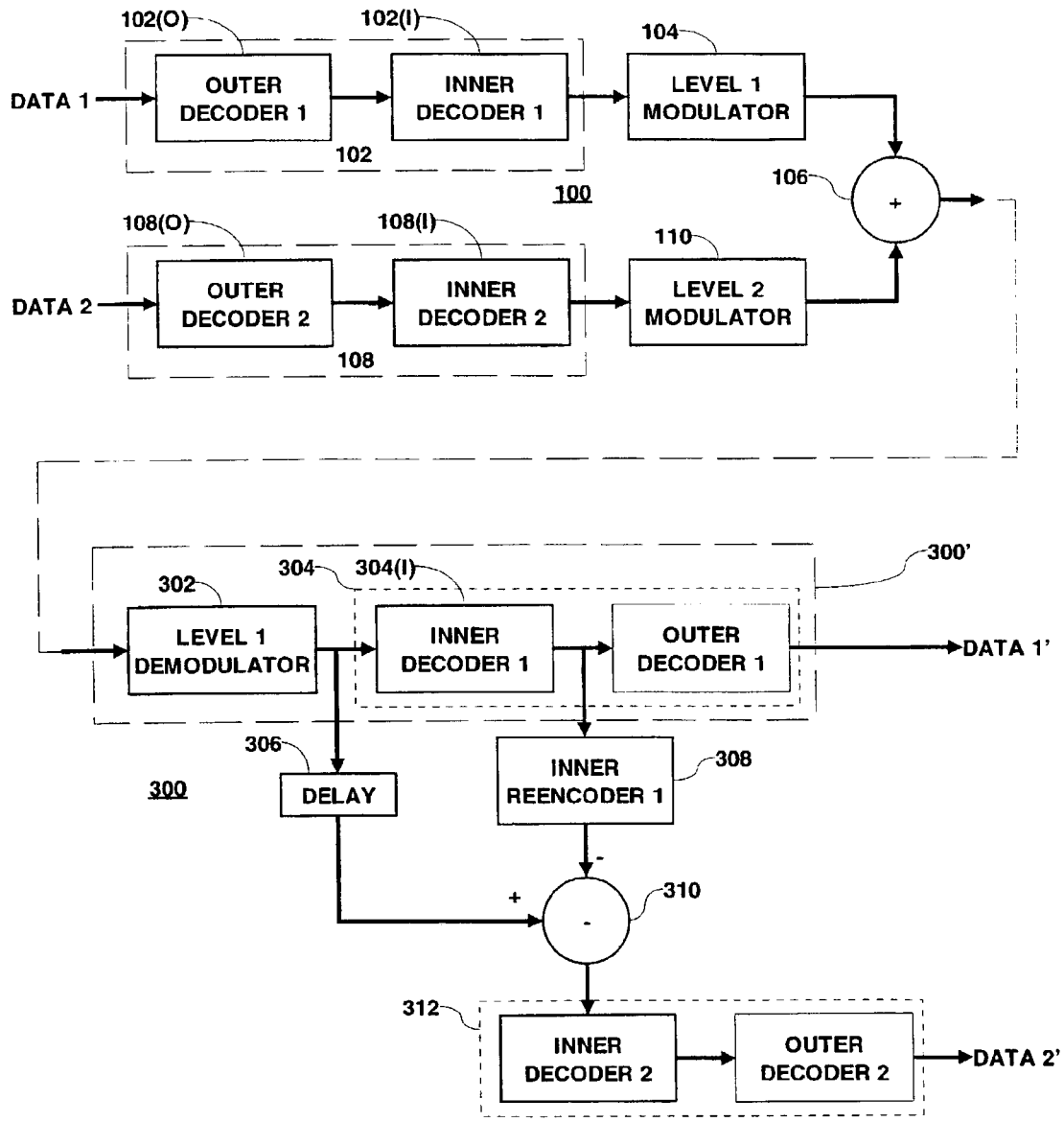
FIG. 4 is a more detailed block diagram of a portion of the transmission system illustrated in FIG. 1 illustrating the operation of differing error detection/correction codes for differing levels.

FIG. 4 is a more detailed block diagram of a portion of the transmission system illustrated in FIG. 1 illustrating the operation of differing error detection/correction codes for differing levels. As described above, different levels of QPSK modulation suffer from differing levels of degradation due to the compression of the distance between the constellation points in the higher levels of modulation by the non-linear high powered amplifiers employed in satellite broadcasting. More specifically, bit errors inherently occur more often at higher levels of the hierarchical modulation than lower levels. To more closely match the bit error rates of the level 1 and level 2 signals, error detection/correction codes having differing performance characteristics are used in the respective data streams. More specifically, more powerful error detection/correction coding will be used in higher level data streams while less powerful error detection/correction coding will be used on lower level data streams. This will optimize the overall performance and information transmission capacity of the transmission system.

In FIG. 4, those elements which are the same as those illustrated in FIG. 1 are designated with the same reference number and are not described in detail below. In FIG. 4, the first error detection/correction encoder 102 in the transmitter 100 is partitioned into a serial connection of an outer encoder 102(O) and an inner encoder 102(I). Similarly, the second error detection/correction encoder 108 is partitioned into a serial connection of an outer encoder 108(O) and an inner encoder 108(I). In a corresponding manner, the first error detection/correction decoder 304 in the receiver 300 is partitioned into a serial connection of an inner decoder 304(I) and an outer decoder 304(O). Similarly, the second error detection/correction decoder 312 is partitioned into a serial connection of an inner decoder 312(I) and an inner encoder 312(O) As disclosed in the above mentioned patent, the outer encoder/decoder pairs implement a block coding technique, such as Hamming codes, Hadamard codes, Cyclic codes and Reed-Solomon (RS) codes, while the inner encoder/decoder pairs implement a convolutional code.

In FIG. 4, the coding used for the level 2 data stream is more powerful than the coding used for the level 1 data stream. More specifically, the convolutional code used in the inner encoder/decoder pair in the level 2 data stream is more powerful than the convolutional code used in the inner encoder/decoder pair in the level 1 data stream. For example, in a preferred embodiment, the first inner encoder/decoder pair, processing the level 1 data stream, implements a rate ½, constraint length 7 convolutional code punctured to a rate of 0. The second inner encoder/decoder pair, processing the level 2 data stream, implements a rate ½ convolutional code without puncturing. The coding of the level 2 data stream is more powerful than that of the level 1 data stream. This more closely matches the bit error rate performance of the level 1 and level 2 data streams, and optimizes the performance of the transmission system as a whole.

As described above, and illustrated in FIG. 1, the level 1 demodulator 302 and decoder 304 cooperate to detect the DATA 1 signal from the received constellation. Then a reconstructed ideal signal, from reencoder 308, representing this detected DATA 1 signal is then subtracted from the received constellation, and ideally results in translation of the received constellation to form another constellation of the sub-quadrants within the detected quadrant. However, this translation operation is very sensitive to any mismatch between the actual "center point" of the quadrant as received, and the ideal center point (displaced by ±1 from the origin of the level 1 constellation) assumed by the reencoder 308. Any mismatch in size between the received constellation and the ideal constellation results in the actual center point of the received quadrant being displaced from the assumed center point, and when the received constellation is translated by the reencoder 308 and subtractor 310, results in the actual center point of the displaced sub-quadrant being displaced from the origin assumed by the second decoder 312. Thus, the gain of the received channel must be accurately adapted to, in order to place the center point of the sub-quadrant in the proper location (origin) to be accurately decoded by the second decoder 312.

In known transmission systems, the gain of the system is determined by comparing the received constellation of data points to a known ideal constellation of data points. There are several problems associated with accurate maintenance of the gain in this manner, however. First, in some transmission systems, the locations of the constellation points may be deliberately distorted from their ideal locations. The resulting constellation does not have the equi-spaced points illustrated in FIG. 2. Second, the transmission channel is not constant, and may be noisy with varying amounts of non-linearity. To determine the location of the center point of the quadrants, and thus the gain of the system, in such systems, the center-of-gravity of all the data points in the quadrants is determined.

Figure 7:
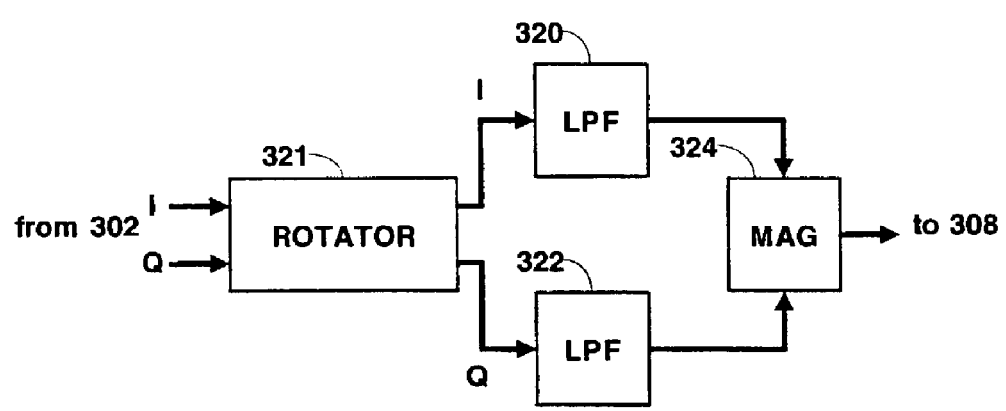
FIG. 7 is a block diagram of circuitry for determining the center of gravity of a quadrant of a received constellation of data points.

FIG. 7 is a block diagram of circuitry for determining the center of gravity of a quadrant of a received constellation of data points. In FIG. 7, a rotator 321 receives I and Q values representing I and Q components of successive received data points from the level 1 demodulator 302 (of FIG. 1). An I output terminal of the rotator 321 is coupled to an input terminal of an I low pass filter (LPF) 320. A Q output terminal of the rotator 321 is coupled to an input terminal of a Q LPF 322. Respective output terminals of the I and Q LPFs, 320 and 322, are coupled to corresponding input terminals of a magnitude calculating circuit 324. An output terminal of the magnitude calculating circuit 324 is coupled to the reencoder 308.

Figure 5:
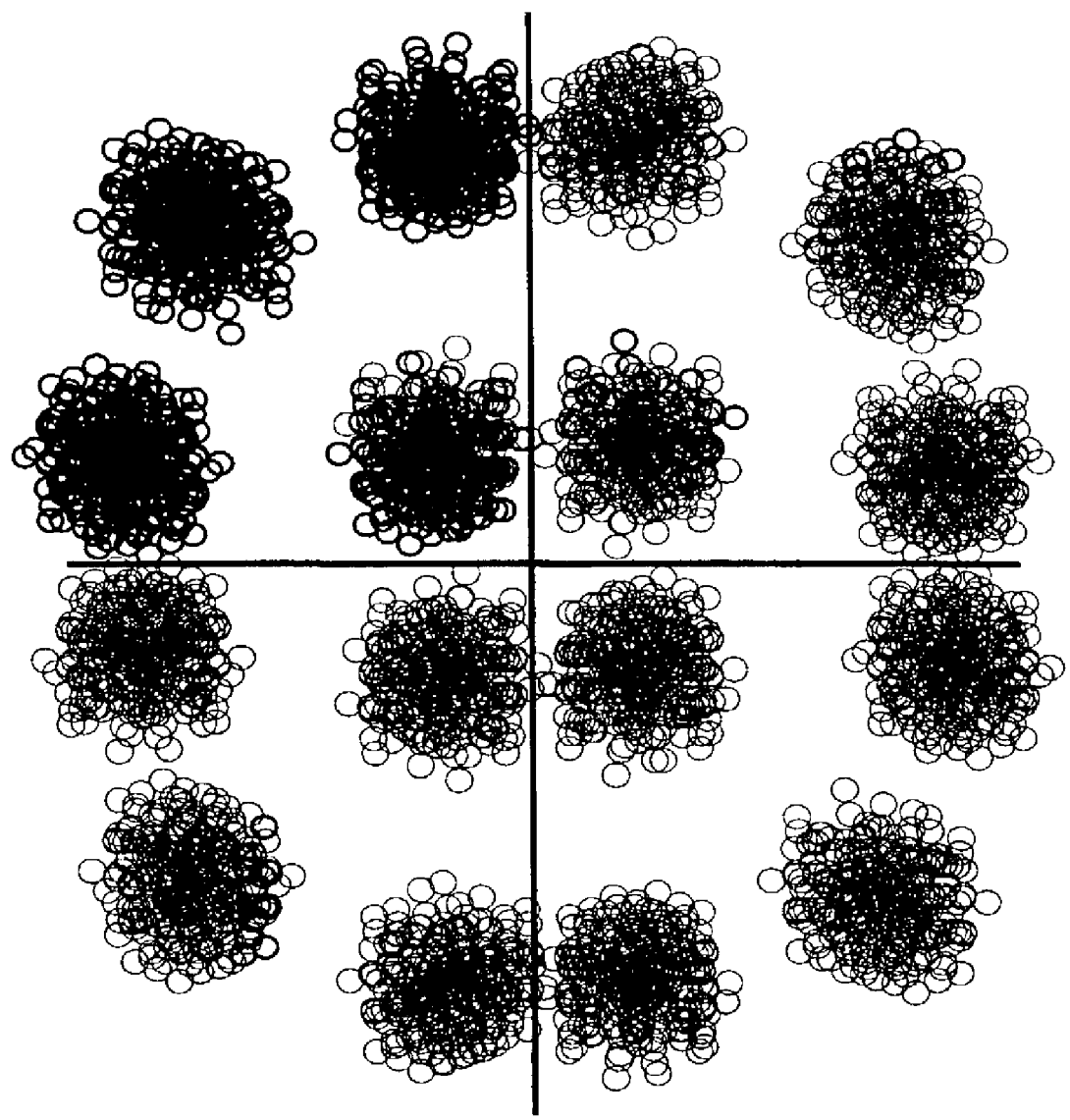
FIG. 5 is a diagram of a received constellation.
Figure 6:
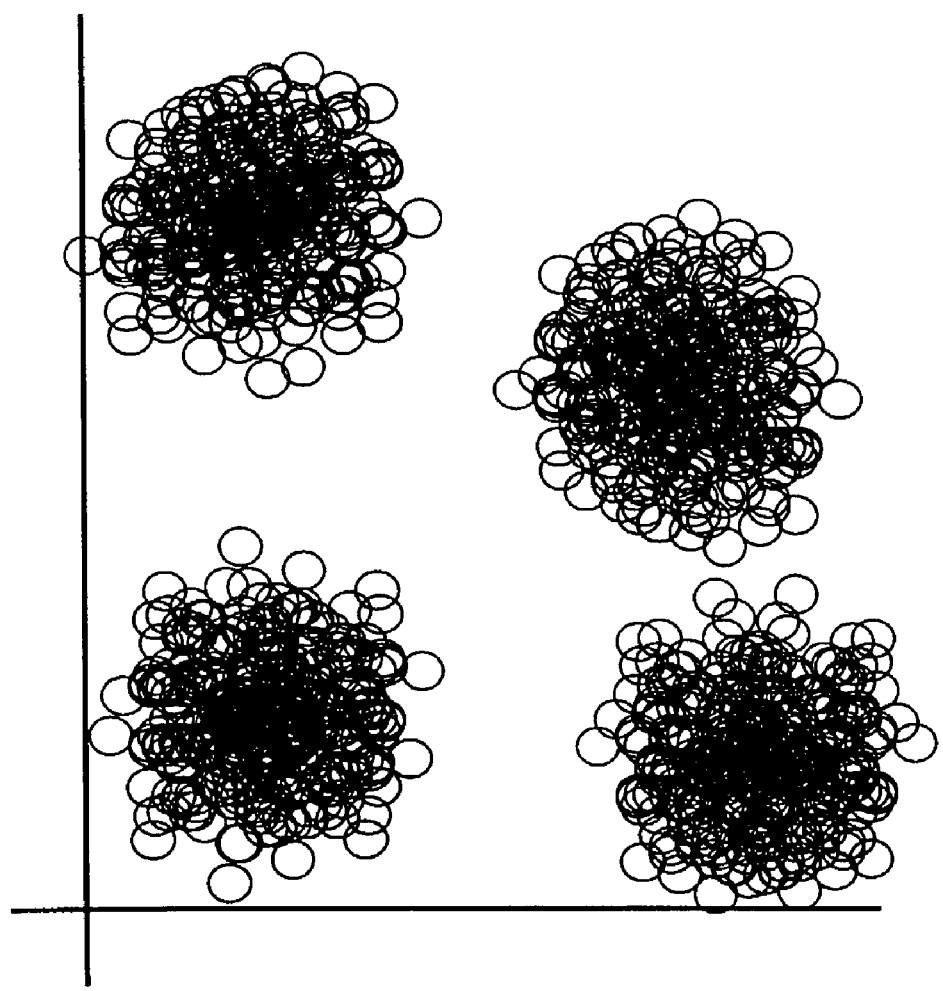
FIG. 6 is a diagram of one quadrant of a received constellation distorted by the transmission channel.

In operation, the rotator 321 rotates all of the received values from whatever quadrant they were received in to the upper right hand quadrant in a known manner. FIG. 5 is a diagram of a received constellation and shows the locations of a plurality of successive received modulated data points. The received data points form scatters in the respective neighborhoods of the assumed locations of the received constellation points in all four quadrants. FIG. 6 is a diagram of the upper right hand quadrant of a received constellation all of whose data points have been rotated to this quadrant by the rotator 321. The quadrant illustrated in FIG. 6 represents a constellation which has been distorted by either deliberate pre-distortion of the transmitted constellation points and/or by the operation of the transmission channel 200.

The I component of the rotated data points from the rotator 321 is low pass filtered in the LPF 320 with a sliding moving average of n points. In the illustrated embodiment, the sliding moving average is calculated using the preceding 500 data points. The Q component of the rotated data points from the rotator 321 is similarly low pass filtered with a sliding moving average. One skilled in the art will understand that the low pass filters 320, 322 may also be constructed using respective IIR digital filters. The low pass filtering operation produces the respective I and Q components of the center of gravity of the received data points in the quadrant. The estimate of the magnitude of the center of gravity is calculated in the magnitude calculating circuit 324. For example if $r_i[n]$ is the filtered in-phase I component, and $r_q[n]$ is the filtered quadrature Q component, then the magnitude of the center of gravity is calculated as $M=\sqrt{r_i[n]^2+r_q[n]^2}$. The magnitude of the center of gravity M should ideally be $\sqrt{2}=1.4$. The magnitude of the ideal reconstructed signal from the reencoder 308 is adjusted in response to the magnitude of the calculated center of gravity M. By properly adjusting the magnitude of the reconstructed ideal signal from the reencoder 308, the centers of the respective received quadrants will be properly translated to the origin by the subtractor 310, and allow for accurate decoding of the level 2 and higher data signals.

The circuit illustrated in FIG. 7 will operate independently of the method of transmission, whether linear or non-linear. It also operates properly in the presence of a pre-distorted transmission constellation, or with non-standard grouping factors (described in more detail below). It has been found that the circuit works well in practice with no measurable degradation when used on hierarchical 16QAM transmission system over a linear channel when compared with exact knowledge of the locations of the centers of the quadrants. The circuit also operates well in the presence of noise and in particular in the presence of channel distortion caused by non-linear channels, such as found in direct satellite television signal transmission systems. Such a circuit improves the performance of the higher level data streams, and thus, improves the overall performance of the transmission system.

Referring again to FIG. 1, in known hierarchical QAM transmission systems, the constellation generated by the level 2 modulator 110 is combined in the signal combiner 106 with the constellation generated by the level 1 modulator 104 after being weighted in the variable gain amplifier 111 by a factor of 0.5. The weighting factor of 0.5 is termed the grouping factor and may be varied to change the relative performance of the level 1 and level 2 data streams, as described in more detail below. Referring to FIG. 2a, the resulting constellation consists of equispaced constellation points. As described above, such an arrangement results in a transmission system in which the performance of the level 1 data stream, in terms of bit error rate, is better than that of the level 2 data stream. By varying the grouping factor, the relative performance of the level 1 and level 2 data streams may be more closely matches.

Figure 8:
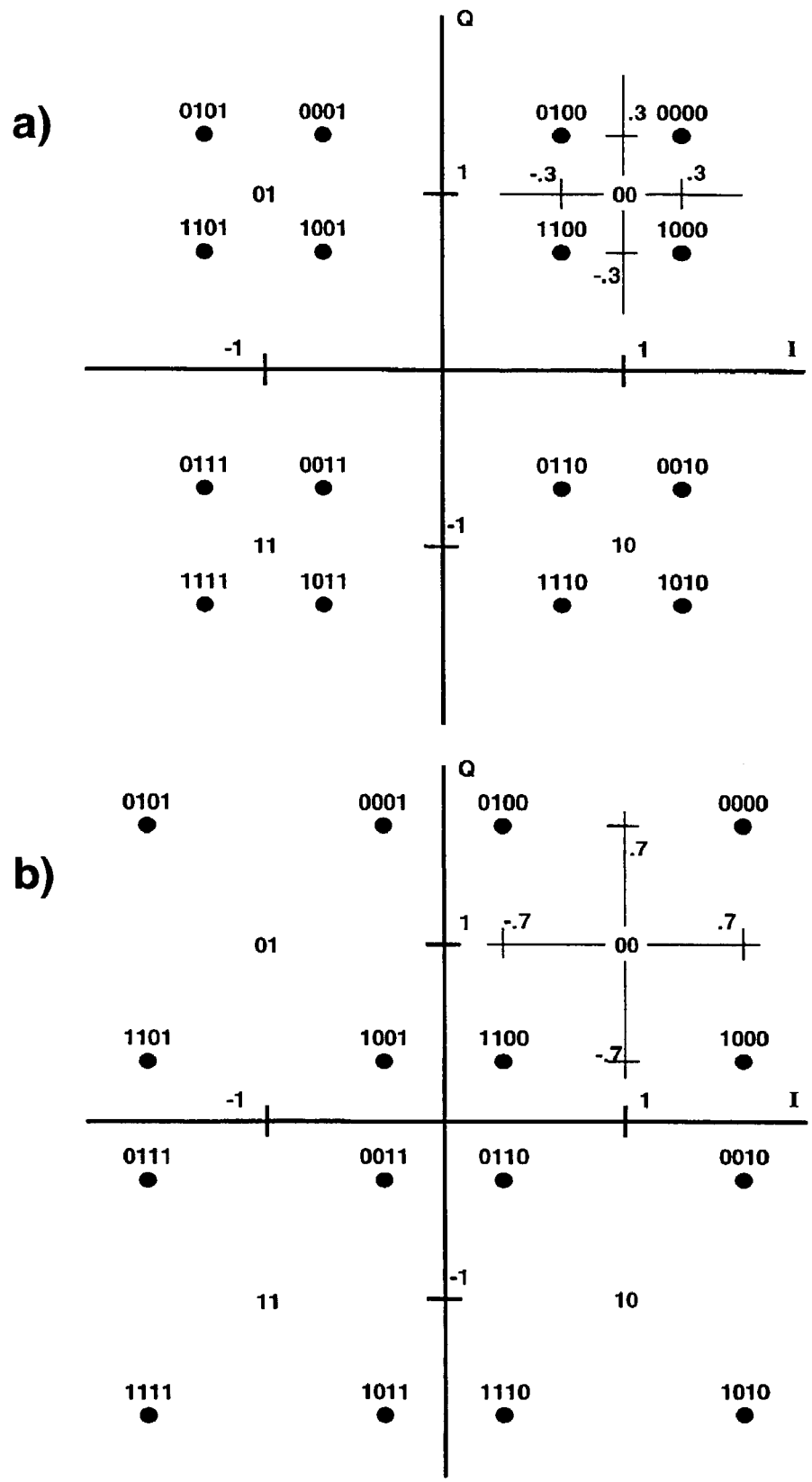
FIG. 8 is a diagram of a constellation illustrating the use of grouping factors to vary the relative bit rate performance of the different level signals in a hierarchical QAM signal.

Referring to FIG. 8a, the gain of the variable gain amplifier (111 of FIG. 1) is conditioned to be 0.3. The resulting constellation points are spaced only 0.3 from the center point of the quadrant. One skilled in the art will recognize that in the constellation illustrated in FIG. 8a, the constellation points in a quadrant are further away from constellation points in other quadrants than in the constellation illustrated in FIG. 2a. Conversely, the constellation points within a quadrant are closer together than those illustrated in FIG. 2a. Such a system allows more accurate determination of which quadrant the level 1 data signal is in at the expense of less accurate determination of the constellation point of the level 2 data signal within the quadrant, thus, increasing the performance of the level 1 data stream and decreasing the performance of the level 2 data stream, when compared to the system of FIG. 2a.

Referring to FIG. 8b, the gain of the variable gain amplifier (111 of FIG. 1) is conditioned to be 0.7. The resulting constellation points are spaced 0.7 from the center point of the quadrant. One skilled in the art will recognize that in the constellation illustrated in FIG. 8b, the constellation points in a quadrant are closer to constellation points in other quadrants than in the constellation illustrated in FIG. 2a. Conversely, the constellation points within a quadrant are further apart than those illustrated in FIG. 2a. Such a system allows more accurate determination of the constellation point of the level 2 data signal within the quadrant at the expense of less accurate determination of which quadrant the level 1 data signal is in, thus, increasing the performance of the level 2 data stream and decreasing the performance of the level 1 data stream, when compared to the system of FIG. 2a.

By proper setting of the gain of the variable gain amplifier 111 (of FIG. 1), the grouping of the constellation points with each cluster may be placed optimally to more closely match the performance of the level 1 and level 2 data streams. It has been determined that for a 16QAM transmission system transmitted through a non-linear direct satellite television channel, a grouping factor of around 0.6 to around 0.7 will more closely match the bit error rate performance of the level 1 and level 2 data streams. This will increase the overall performance of the transmission system as a whole.

What is claimed is:

1. A hierarchical QAM transmission system, comprising:
a source of data symbols (DATA 1, DATA2), each representing a multibit binary value;
a hierarchical QAM transmitter (102, 104, 106, 108, 110, 111), responsive to the value of a data symbol for transmitting one of a constellation of data points in the I-Q plane, each data point in the constellation associated with a respective value of a symbol such that symbol values of adjoining constellation data points differ by no more than one bit; and
a hierarchical QAM receiver (302, 304, 306, 308, 310, 312), responsive to a received data point, for generating a received symbol (DATA 1', DATA 2'), and characterized by the transmitter comprising:
a level 1 QPSK modulator (104), responsive to a level 1 portion (DATA 1) of a data symbol, for generating respective I and Q signals representing a center point of a predetermined one of four quadrants associated with the value of the level 1 portion of the data symbol;
a level 2 QPSK modulator (110), responsive to a level 2 portion of the data symbol (DATA2), for generating respective I and Q signals representing a center point of the predetermined one of four quadrants associated with the value of the level 2 portion of the data symbol;
a signal combiner (106, 111; 106(I), 106(Q)), coupled to the level 1 modulator (104) and the level 2 modulator (110), for weighting the respective I and Q signals from the level 2 QPSK modulator (110) by a weighting factor of 0.5 and combining the weighted level 2 I and Q signals with the respective I and Q signals from the level 1 modulator; and
a gray code mapper (112), coupled between the level 2 QPSK modulator (110) and the signal combiner (106, 111), for remapping the respective I and Q signals from the level 2 QPSK modulator (110) responsive to the first portion (DATA 1) of the data symbol (DATA1, DATA 2).

2. The system of claim 1 characterized in that:
the level 1 (DATA 1) and level 2 (DATA2) portions of the data symbol (DATA 1, DATA 2) are respective sets of two bits of the multibit binary value;
the level 1 (104) and level 2 (110) modulators generate respective I and Q signals in an upper right hand quadrant of the I-Q plane if the set of two bits is 00 (0); in an upper left hand quadrant of the I-Q plane if the set of two bits is 01 (1), in a lower right hand quadrant of the I-Q plane of the set of two bits is 10 (2), and a lower left hand quadrant of the I-Q plane if the set of two bits is 11 (3); and
the gray code mapper (112) comprises an input terminal coupled to the level 2 modulator (110) for receiving respective I and Q input signals, and an output terminal coupled to the signal combiner (106, 111) for generating respective I and Q output signals, and remaps the respective I and Q input signals to respective I and Q output signals by: if the level 1 portion (DATA 1) of the data symbol is 0, then the I and Q output signals are equal to the I and Q input signals respectively; if the level 1 portion (DATA 1) of the data symbol is 1, then the I output signal is equal to the negative of the I input signal, and the Q output signal is equal to the Q input signal, if the level 1 portion (DATA 1) of the data symbol is 2, then the I output signal is equal to the I input signal and the Q output signal is equal to the negative of the Q input signal, and if the level 1 portion (DATA 1) of the data symbol is 3, then the I output signal is equal to the negative of the I input signal and the Q output signal is equal to the negative of the Q input signal.

3. The system of claim 1 characterized in that the hierarchical QAM receiver comprises:
a demodulator (302), for generating respective received I and Q signals representing the received data point;
a level 1 decoder (304), responsive to the received I and Q signals, for generating a received level 1 symbol (DATA 1');
translating circuitry (306, 308, 310), coupled to the demodulator (302) and the level 1 decoder (304), for generating respective I and Q signals representing a received level 2 data point (DATA 2');
a level 2 decoder (312), responsive to the respective I and Q signals representing the received level 2 data point, for generating respective I and Q signals representing a received level 2 symbol (DATA 2'); and
a gray code mapper (314), coupled between translating circuitry (306, 308, 310) and the level 2 decoder (312), for remapping the respective I and Q signals representing the level 2 data point in response to the received level 1 symbol (DATA 1).

4. The system of claim 3 characterized in that the translating circuitry (306, 308, 310) comprises:
a reencoder (308), coupled to the level 1 decoder (304), for generating respective I and Q signals representing the ideal center point of the quadrant of the received level 1 symbol (DATA 1); and
a subtractor (310) having a subtrahend input terminal coupled to the reencoder (308), a minuend input terminal coupled to the demodulator (302), and an difference output terminal generating the respective I and Q signals representing the received level 2 data point.

5. The system of claim 1 characterized in that the gray code mapper (314) comprises:
   an input terminal coupled to the translating circuitry (306, 308, 310) for receiving respective I and Q input signals;
   an output terminal coupled to the level 2 decoder (312) for generating respective I and Q output signals; and
   circuitry for remapping the respective I and Q input signals to respective I and Q output signals by: if the received level 1 symbol (DATA 1') is 0, then the I and Q output signals are equal to the I and Q input signals respectively; if the received level 1 symbol (DATA 1') is 1, then the I output signal is equal to the negative of the I input signal, and the Q output signal is equal to the Q input signal, if the received level 1 symbol (DATA 1') is 2, then the I output signal is equal to the I input signal and the Q output signal is equal to the negative of the Q input signal, and if the received level 1 symbol (DATA 1') is 3, then the I output signal is equal to the negative of the I input signal and the Q output signal is equal to the negative of the Q input signal.

6. The system of claim 1 characterized in that:
   the hierarchical QAM transmitter (100) comprises a ground station transmitting antenna;
   the hierarchical QAM receiver (300) comprises a receiving antenna; and
   the transmission system (200) further comprises a satellite for receiving the signal transmitted from the hierarchical QAM transmitter (100) ground station transmitting antenna and broadcasting a signal receivable by the receiving antenna of the hierarchical QAM receiver (300).

7. The system of claim 1 characterized in that the source of data symbols comprises:
   a first source (DATA 1) of digital data;
   a second source (DATA 2) of digital data; and
   wherein the data symbol is a combination of data from the first digital data source (DATA 1) and the second digital data source (DATA 2).

8. The system of claim 7 characterized in that the first (DATA 1) and second (DATA 2) digital data sources generate respective bit streams and the data symbol is a combination of a set of two bits from the first digital data source (DATA 1) and a set of two bits from the second digital data source (DATA 2).

9. A hierarchical QAM transmitting system, comprising:
   a source of data symbols (DATA 1, DATA 2), each representing a multibit binary value; and
   a hierarchical QAM transmitter (102, 104, 106, 108, 110, 111), responsive to the value of a data symbol for transmitting one of a constellation of data points in the I-Q plane, each data point in the constellation associated with a respective value of a symbol such that symbol values of adjoining constellation data points differ by no more than one bit, the transmitter characterized by:
   a level 1 QPSK modulator (104), responsive to a level 1 portion (DATA 1) of a data symbol, for generating respective I and Q signals representing a center point of a predetermined one of four quadrants associated with the value of the level 1 portion (DATA 1) of the data symbol;
   a level 2 QPSK modulator (110), responsive to a level 2 portion (DATA 2) of the data symbol, for generating respective I and Q signals representing a center point of the predetermined one of four quadrants associated with the value of the level 2 portion (DATA 2) of the data symbol;
   a signal combiner (106, 111), coupled to the level 1 modulator (104) and the level 2 modulator (110), for weighting the respective I and Q signals from the level 2 QPSK modulator (110) by a weighting factor of 0.5 and combining the weighted level 2 I and Q signals with the respective I and Q signals from the level 1 modulator (104); and
   a gray code mapper (112), coupled between the level 2 QPSK modulator (110) and the signal combiner (106, 111), for remapping the respective I and Q signals from the level 2 QPSK modulator (110) responsive to the first portion (DATA 1) of the data symbol.

10. The transmitting system of claim 9 characterized in that:
    the level 1 (DATA 1) and level 2 (DATA 2) portions of the data symbol are respective sets of two bits of the multibit binary value;
    the level 1 (104) and level 2 (110) modulators both generate respective I and Q signals in an upper right hand quadrant of the I-Q plane if the set of two bits is 00 (0); in an upper left hand quadrant of the I-Q plane if the set of two bits is 01 (1), in a lower right hand quadrant of the I-Q plane of the set of two bits is 10 (2), and a lower left hand quadrant of the I-Q plane if the set of two bits is 11 (3); and
    the gray code mapper (112) comprises an input terminal coupled to the level 2 modulator (110) for receiving respective I and Q input signals, and an output terminal coupled to the signal combiner (106, 111) for generating respective I and Q output signals, and remaps the respective I and Q input signals to respective I and Q output signals by: if the level 1 portion (DATA 1) of the data symbol is 0, then the I and Q output signals are equal to the I and Q input signals respectively; if the level 1 portion (DATA 1) of the data symbol is 1, then the I output signal is equal to the negative of the I input signal, and the Q output signal is equal to the Q input signal, if the level 1 portion (DATA 1) of the data symbol is 2, then the I output signal is equal to the I input signal and the Q output signal is equal to the negative of the Q input signal, and if the level 1 portion (DATA 1) of the data symbol is 3, then the I output signal is equal to the negative of the I input signal and the Q output signal is equal to the negative of the Q input signal.

11. The transmitting system of claim 9 characterized in that the source of data symbols comprises:
    a first source (DATA 1) of digital data; and
    a second source (DATA 2) of digital data;
    wherein the data symbol is a combination of data from the first digital data source (DATA 1) and the second digital data source (DATA 2).

12. The transmitting system of claim 11 characterized in that the first (DATA 1) and second (DATA 2) digital data sources generate respective bit streams and the data symbol is a combination of a set of two bits from the first digital data source (DATA 1) and a set of two bits from the second digital data source (DATA 2).

13. The transmitting system of claim 9 characterized in that the hierarchical QAM transmitter (100) further comprises a satellite ground station transmitting antenna.

14. A hierarchical QAM receiving system comprising:
    a source (200) of a received QAM signal representing a received data point, the received data point representing a transmitted one of a constellation of data points in the I-Q plane, each transmitted data point associated with a respective value of a transmitted symbol such that symbol values of adjoining constellation data points differ by no more than one bit; and a hierarchical QAM receiver (300), responsive to the received data point, for generating a received symbol (DATA 1', DATA 2'), and characterized by:

a demodulator (302), for generating respective received I and Q signals representing the received data point;

a level 1 decoder (304), responsive to the received I and Q signals, for generating a received level 1 symbol (DATA 1');

translating circuitry (306, 308, 310), coupled to the demodulator (302) and the level 1 decoder (304), for generating respective I and Q signals representing a received level 2 data point;

a level 2 decoder (312), responsive to the respective I and Q signals representing the received level 2 data point, for generating respective I and Q signals representing a received level 2 symbol (DATA 2'); and a gray code mapper (314), coupled between translating circuitry (306, 308, 310) and the level 2 decoder (312), for remapping the respective I and Q signals representing the level 2 data point in response to the received level 1 symbol (DATA 1').

15. The receiving system of claim 14 characterized in that the gray code mapper (314) comprises an input terminal coupled to the translating circuitry (306, 308, 310) for receiving respective I and Q input signals, and an output terminal coupled to the level 2 decoder (312) for generating respective I and Q output signals, and remaps the respective I and Q input signals to respective I and Q output signals by: if the received level 1 symbol (DATA 1') is 0, then the I and Q output signals are equal to the I and Q input signals respectively; if the received level 1 symbol (DATA 1') is 1, then the I output signal is equal to the negative of the I input signal, and the Q output signal is equal to the Q input signal, if the received level 1 symbol (DATA 1') is 2, then the I output signal is equal to the I input signal and the Q output signal is equal to the negative of the Q input signal, and if the received level 1 symbol (DATA 1') is 3, then the I output signal is equal to the negative of the I input signal and the Q output signal is equal to the negative of the Q input signal.

16. The receiving system of claim 14 wherein the QAM signal source (200) comprises a satellite receiving antenna.

* * * * *